May 1, 1956 — F. L. SCHARAFFA — 2,743,628
TORQUE-CONVERTING COUPLINGS
Filed April 6, 1951 — 3 Sheets-Sheet 1

Inventor:
Frank L. Scharaffa
by John H. McKune
Attorney

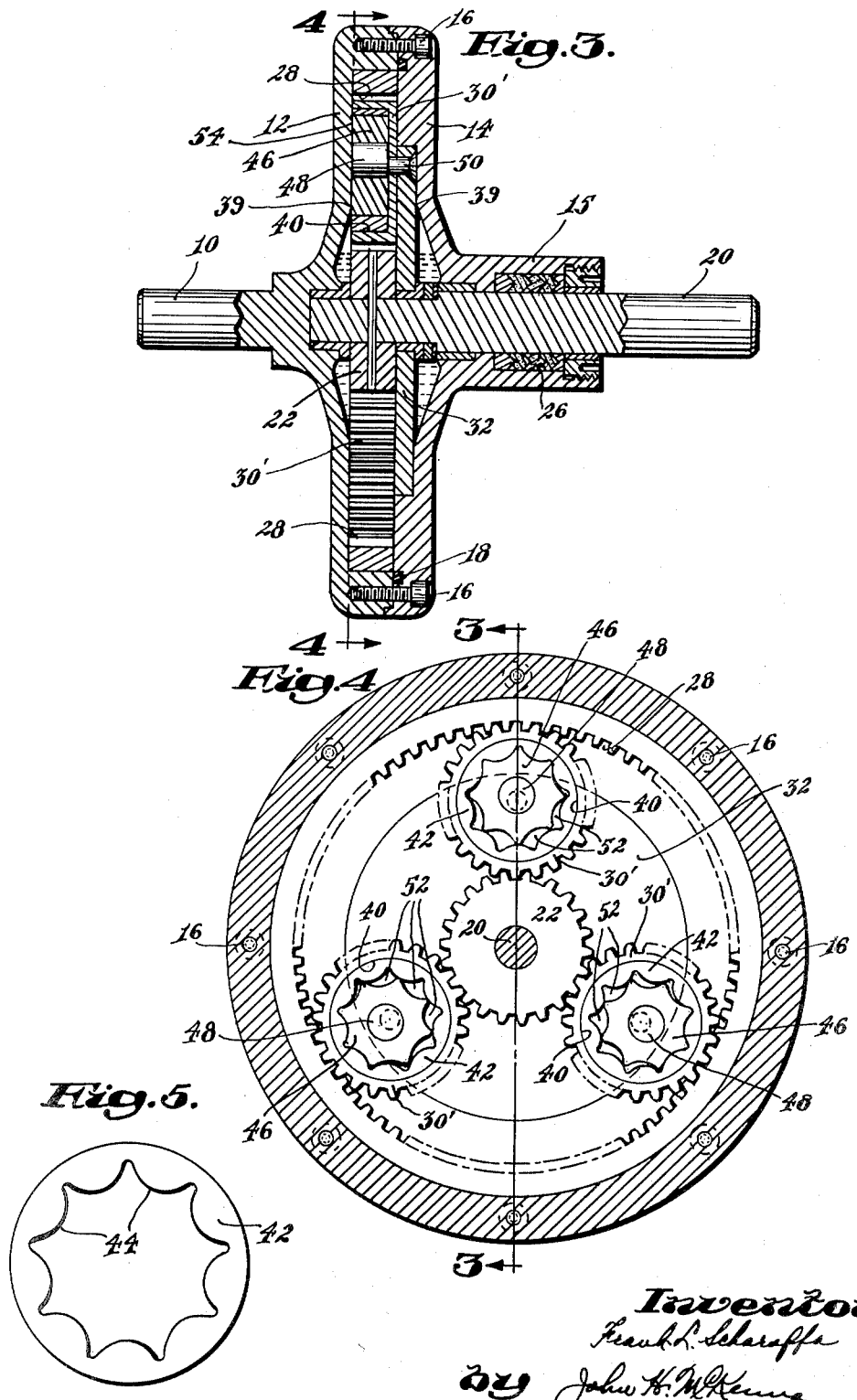

May 1, 1956 — F. L. SCHARAFFA — 2,743,628
TORQUE-CONVERTING COUPLINGS

Filed April 6, 1951 — 3 Sheets-Sheet 3

Inventor:
Frank L. Scharaffa
by John H. McKenna
Attorney

United States Patent Office 2,743,628
Patented May 1, 1956

2,743,628
TORQUE-CONVERTING COUPLINGS

Frank L. Scharaffa, East Boston, Mass., assignor to National Engineering Corp., Boston, Mass., a corporation of Massachusetts Application April 6, 1951, Serial No. 219,540

8 Claims. (Cl. 74—794)

This invention relates to improvements in torque-converting couplings. More particularly it provides a torque-converting coupling having a relatively small quantity of oil or other liquid permanently sealed therein and coacting with interior elements of the coupling to provide a highly efficient hydro-mechanical load-responsive automatic clutch between a driving member and a driven member, with provision for cushioned, uninterrupted and steady transmission of power during periods of acceleration and during subsequent periods of attained operating speed of the driving member, with the coupling responding automatically to changing load conditions and preventing damage to the power means and distortion or breakage of parts if and when excessive overloads are encountered.

Heretofore, practicable efficiency values have been attained with fluid transmissions and fluid couplings wherein a considerable body of oil, or other liquid, has intervened between driving and driven members which have had a series of cups or dished blades thereon with the cups or blades of one member axially spaced from, and disposed oppositely to, the cups or blades of the other member. The liquid has constituted the only driving connection between the driving and driven members, and the members have been rotatable only in one direction with any acceptable degree of efficiency. Also, such prior transmissions and couplings have left much to be desired in the way of positiveness and smoothness of the transmission of power under changing load and speed conditions.

It is among the objects of the present invention to provide an effective and efficient torque-converting coupling, of relatively simple and compact construction, wherein driving and driven members are constantly mechanically inter-engaged, and a relatively small amount of oil, or other liquid, is sealed within the coupling and constitutes a control medium through which the driving member transmits its power to the driven member with a desirable cushioning effect at the regions of mechanical interengagement of the said members. According to the invention the driving and driven members are constantly mechanically interconnected by a system of inter-engaging gears, but the gears are relatively rotatable to permit relative rotation of the driving and driven members excepting that relatively small amounts of oil, or other liquid, become trapped in locking relation to portions of the gears, and the gears become locked against relative rotation and prevent relative rotation of the driving and driven members. However, if the load and/or speed conditions become such that pressure on the trapped liquid exceeds a predetermined relatively high pressure, the trapped liquid can escape through minute passages, thereby permitting needed relative rotation of the gears and of the driving and driven members sufficient to relieve the operating parts of distorting or breaking stresses.

Another object of the invention is to provide a torque-converting coupling through the medium of which a driving member may drive a driven member in either direction with equally high efficiency. Inter-meshing gears within the coupling are mounted for rotation in either direction but become locked against relative rotation by a relatively small quantity of oil, or other liquid, sealed within the coupling, the locking of the gears resulting from liquid trapped between portions of the gears but adapted to escape under a predetermined amount of pressure, the action being the same regardless of the direction of rotation of the driving member.

A further object of the invention is to provide a torque-converting coupling wherein relatively small bodies of liquid intervene between mechanically interengaging relatively movable elements and constitute cushions for absorbing pulsations and shocks, while responding automatically to changing load conditions and speeds to provide smooth and gradual pick up of the load.

Yet another object of the invention is to provide a torque-converting coupling for driving and driven members wherein the torque-converting action is substantially identical regardless of which of the interconnected members constitutes the driving member.

It is, moreover, my purpose and object generally to improve the structure and efficiency of torque-converting mechanisms and more especially such mechanisms in the form of torque-converting shaft couplings.

In the accompanying drawings:

Fig. 3 is a view similar to Fig. 1, but showing a modified form of torque-converting coupling, embodying features of the invention, the coupling being in section on line 3—3 of Fig. 4;

Fig. 4 is a cross-sectional view on line 4—4 of Fig. 3;

Fig. 5 is a detail plan view of one of the interiorly scalloped inserts for the planetary gears of Figs. 3 and 4;

Figures 1, 2:
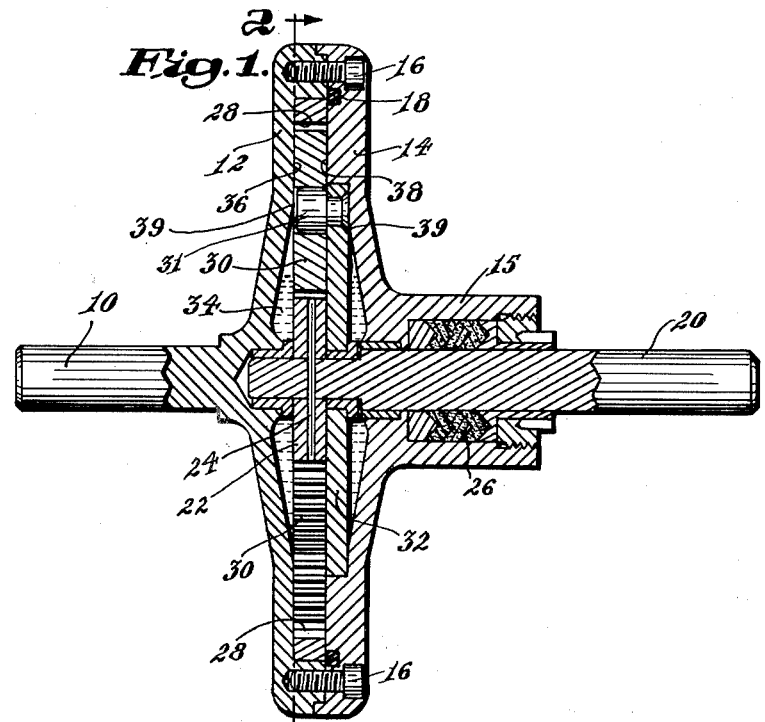
Fig. 1 is a side elevation of a torque-converting coupling embodying features of the invention, in medial cross-section on line 1—1 of Fig. 2.
Fig. 2 is a cross-sectional view on line 2—2 of Fig. 1, with the interior rack and gears in elevation.

Referring to the drawings, shaft 10 may be considered to be a driving shaft which may have one of its ends connected to any suitable source of power. Its other end has integrally formed thereon, or rigidly connected thereto, one section 12 of an annular hollow coupling casing whose other section, indicated at 14, is secured to section 12 by the screws 16, or other comparable means, with suitable packing at 18 for making the casing liquid-tight.

A driven shaft 20 extends axially through the casing section 14 and has a spur gear 22 fixed thereon within the hollow of the coupling casing. As shown, gear 22 is secured to driven shaft 20 by the pin 24, and packing means 26 is provided between shaft 20 and the hub 15 of casing section 14 for preventing escape of liquid through the casing section, along the shaft 20.

The coupling casing section 12 has gear teeth 28 interiorly thereof all around its annulus and a plurality of planetary gears 30, three being shown, are rotatably mounted on a disk 32, each gear 30 being in mesh with the interior teeth 28 which constitute a circular rack within casing section 12, and each gear 30 being also in mesh with the spur gear 22 on driven shaft 20. Disk 32 is rotatably mounted on driven shaft 20, so that the gears 30 can travel in a circular orbit in response to relative rotation of gear 22 and the coupling casing. Each gear 30 is rotatable on a pivot pin 31 which is fixed to disk 32. However, according to the invention, a relatively small quantity of oil 34, or other liquid, is sealed within the casing and, when the coupling casing is rotated, becomes distributed and trapped between meshing gear teeth at the regions where the gears 30 mesh with the interior teeth 28 of casing section 12.

As best seen in Fig. 1, the outer portions of the gears 30 are closely confined between the walls of casing sections 12, 14 so that the ends of the tooth grooves, at the regions of meshing of gears 30 with rack teeth 28, are closed by the casing walls, and the clearance between the casing walls and the opposite sides of the gears 30, at the said meshing regions, is so minute that oil trapped between the meshing teeth cannot escape through the minute clearance passages at 36, 38 so long as the pressure on the trapped oil does not exceed a predetermined relatively high pressure. Hence, the trapped oil effectively locks the gears 30 and the casing rack against relative rotation, and this in turn locks the shafts 10, 20 against relative rotation so long as the torque does not impose pressure on the trapped oil exceeding said predetermined pressure. The locked condition of the gears prevails throughout the range of normal operating speeds under normal load conditions. However, during periods of acceleration of the driving member, the driven member may remain at rest until centrifugal force causes oil, or other liquid, to be trapped between the teeth 28 and the teeth of the planetary gears 30 at their regions of meshing and, even then, the load conditions may be such that the pressure on the trapped oil will be sufficiently great to force the trapped oil through the minute escape passages at 36, 38 which will permit varying amounts of cushioned relative rotation of the driving and driven members, with gradual and shock-free pick-up of the load until both the driving and driven members attain the same normal operating speed, at which time the pressure on the trapped oil will have dropped below the predetermined pressure required to force it through the minute escape passages at 36, 38. Hence, at normal operating speed and under normal load conditions the trapped oil effectively locks the driving and driven members against relative rotation. But, if the load, for any reason, increases in magnitude beyond the capacity of parts to withstand without distortion or breakage, the resulting increased pressure on the trapped oil will force its escape from between the meshing gear teeth into the minute clearance passages at 36, 38 and thence into the wider inner portion of the casing chamber, inward of the circle 39 of juncture of the outer narrower portion of the chamber with the inner wider portion thereof. As the trapped oil is forced from between the meshing gear teeth, relative rotation of the gears and rack will occur and relative rotation of shafts 10, 20, until such time as normal load conditions are restored, or the driving member stopped.

It is a feature of the invention that the operation of the herein described couplings is the same regardless of the direction of rotation of the driving shaft and regardless of which shaft 10 or 20 may be serving as the driving shaft.

In the Figs. 1 and 2 embodiment, oil trapped between the meshing gear teeth is the sole reliance for locking the gears against relative rotation although the gears constantly are in mesh. In other words, there is a constant mechanical connection between the driving and driven shafts 10, 20, with relatively small amounts of trapped oil, or other liquid, constituting the medium through which torque is converted from the driving shaft 10 to the driven shaft 20, and constituting also a pressure responsive means for automatic cushioned adjustment of the power transmitting effect to suit any particular speed and load conditions.

However, the embodiment of the invention as represented in Figs. 3 and 4 presently is considered a preferred form because of its greater efficiency. Whereas the couplings as illustrated in Figs. 1 and 2 have proven approximately eighty-five percent efficient, the preferred embodiment of Figs. 3 and 4 has demonstrated substantially higher efficiencies due to an increased capacity for trapping oil, or other liquid.

The Figs. 3 and 4 embodiment may be in all respects similar to the Figs. 1 and 2 embodiment, excepting that each of the planetary gears 30' in Figs. 3 and 4 has oil-trapping means inserted therein to substantially augment the gear-locking action of the oil as compared with the Figs. 1 and 2 embodiment. Each gear 30' has a relatively large and deep circular cavity 40 formed in one face thereof, concentric to the axis of the gear, and a circular ring element 42 has force fit in each cavity 40, or may be otherwise fixed against rotation in the cavity. Each ring element 42 is interiorly scalloped at 44 for coaction with complementary scallops on a member 46 which is mounted eccentrically in a cavity 40, on an axis 48 which is shown as an eccentric integral projection of the axis 50 of gear 30. Each scalloped member 46 is enough smaller than the scalloped opening through the surrounding ring element 42 so that the scallops inter-mesh at that portion of the ring element adjacent to the inter-meshing teeth of gear 30' and casing section 12 and substantial spaces occur at 52 between scallops further inward toward the axis of the coupling. The spaces at 52 are inward beyond the circle 39 of juncture of the outer narrower portion of casing chamber 34 with the inner wider portion thereof, and oil, or other liquid, can freely enter the spaces at 52, and the liquid in those spaces, when carried around to positions outward of the circle 39, becomes trapped between the scallops of member 46 and ring element 42 and locks these elements against relative movement, thus supplementing the locking action of liquid trapped between the inter-meshing teeth of gear 30' and the rack on casing section 12, as described in connection with Figs. 1 and 2. As in the case of oil trapped between the gear teeth, the oil trapped between the scallops of the member 46 and element 42 of each gear 30' cannot escape so long as the pressure on the trapped oil does not exceed a predetermined magnitude. But, if the torque builds up sufficiently to impose pressure on the trapped oil exceeding said predetermined pressure, the trapped oil becomes squeezed out from between the scallops through the minute passages at 54, between the wall of casing section 12 and the insert elements 42 and members 46, thereby to permit relative rotation of the gears and of shafts 10 and 20, it being assumed that trapped oil between meshing gear teeth will be simultaneously squeezed out at the ends of the teeth through the minute passages at 36, 38 as described in connection with the embodiment of Figs. 1 and 2.

It will be apparent that each scalloped member 46 will rotate with its scalloped ring element 42 whenever its gear 30' rotates, and that the eccentricity of the members 46 results in the mentioned trapping of oil between the scallops as the scalloped ring elements 42 and the scalloped members 46 rotate on different axes.

It is not necessary that the space within the casing chamber 34 be entirely filled with oil, or other liquid, because centrifugal force will be acting to keep the liquid at outer regions of the chamber where it will get between the teeth of gears 30, 30' and the casing rack as they come into initial meshing engagement, to become trapped as the teeth come into a more complete meshing relation. Also, assuming that the liquid is oil, the interior gears and surfaces will be constantly bathed in oil to reduce friction and wear.

Figure 6:
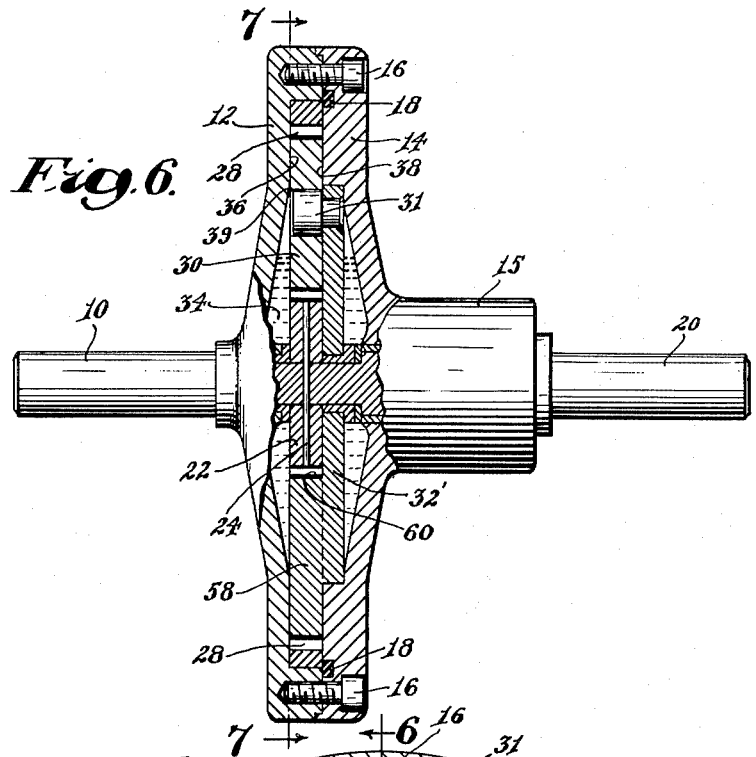
Fig. 6 is a view similar to Fig. 1 but showing a modified form of support for the planetary gears.
Figure 7:
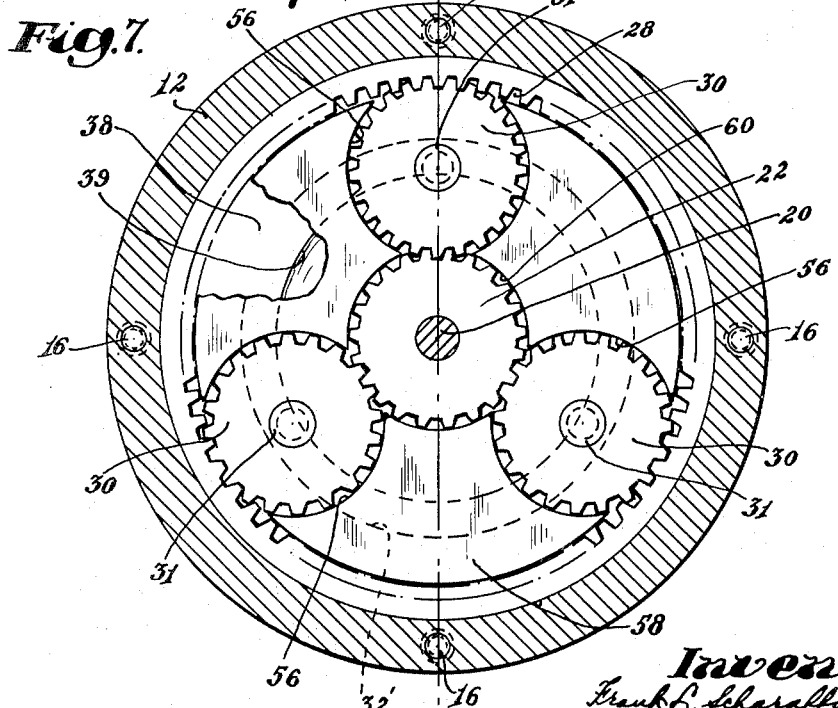
Fig. 7 is a cross-sectional view on line 7—7 of Fig. 6.

Figs. 6 and 7 illustrate an embodiment of the invention wherein the planetary gears 30 or 30' may be set into arcuate cavities 56 formed in a supporting plate member 32' which is rotatably mounted on shaft 20, as in the earlier described embodiments, but which has the integral projecting parts 58 of thickness approximating the thickness of the planetary gears for substantially filling the spaces between the planetary gears and extending into close relation to the teeth 28 on the casing. Gear 22 on shaft 20 also is set into the plate member 32' which has a circular cavity at 60 whose walls closely surround gear 22, excepting that the cavities 56, 60 open into each other at the regions of intermeshing of the planetary gears with gear 22. By thus closely confining the gears 22, 30, the oil, or other liquid, entering the tooth grooves of the gears 30, inward of the circle 39, becomes retained therein and carried outwardly to the regions of intermeshing of the planetary gear teeth with the teeth 28 on the casing, whereby a more certain ample supply of liquid is available for becoming trapped between the planetary gear teeth and the teeth 28 as compared with the earlier described structures. Obviously, either the planetary gears 30 or 30' may be employed with the plate member 32' of the Figs. 6 and 7 embodiment.

It will be apparent from the foregoing description, in connection with the drawings, that my improved torque-converting coupling has driving and driven members which constantly are mechanically interconnected but never mechanically rigidly interconnected. Small amounts of trapped liquid serve to provide a hydromechanical driving connection between the driving and driven members and cushion the drive while being automatically responsive to speed and load conditions without need for any manual shifting of parts in attaining smooth transmission of power both during periods of gradual pick-up of loads and during periods of operation at normal operating speeds under normal and abnormal load conditions. The invention makes it possible and practicable to attain high-efficiency power transmission with a torque-converting coupling of compact and inexpensive construction which will find a wide field of use in the art of power transmission.

It is intended that the patent shall cover, by suitable expression in the appended claims, whatever features of patentable novelty exist in the invention as disclosed.

I claim as my invention:

1. A torque-converter comprising a hollow casing, a shaft extending rotatably through a wall of said casing and having an end portion within the hollow of the casing, a gear fixed on said end portion of said shaft, a member rotatable on said shaft within the hollow of the casing, internal gear teeth on said casing arranged in the form of a circular rack on the peripheral wall of the hollow of the casing, each pair of adjacent internal gear teeth on said casing defining a groove between the teeth of each said pair, a plurality of planetary gears rotatably mounted on said rotatable member, each of said planetary gears having peripheral teeth of which some always are in mesh with said internal gear teeth on the casing and some always are in mesh with the teeth of said gear on said shaft, each pair of adjacent teeth of each of said planetary gears defining a groove between the teeth of each said pair of planetary gear teeth, and a substantial body of liquid permanently sealed within the hollow of the casing, said hollow of the casing having opposite side wall portions closely confining the portions of said planetary gears and internal gear teeth of the casing which at any time are in mesh, with said confining wall portions closing the opposite ends of the grooves between the teeth which are in mesh, whereby liquid in the grooves between the said meshing teeth becomes trapped therein by said confining wall portions of the casing, there being clearance cracks between said confining walls of the casing and the confined portions of said planetary gears and internal gear teeth of such thinness that said trapped liquid can escape from said grooves through said clearance cracks only if and when the trapped liquid is subjected to a pressure in excess of a predetermined pressure.

2. A torque-converter comprising a hollow casing, a shaft extending rotatably through a wall of said casing having an end portion within the hollow of the casing, a gear fixed on said end portion of said shaft, a member rotatable on said shaft within the hollow of the casing, internal gear teeth on said casing arranged in the form of a circular rack on the peripheral wall of the hollow of the casing, a plurality of planetary gears rotatably mounted on said rotatable member, each of said planetary gears being in mesh with said internal gear teeth on the casing and also in mesh with the teeth of said gear on said shaft, and a substantial body of liquid permanently sealed within the hollow of the casing, the walls of the hollow of said casing having portions closely confining said planetary gears at the regions of meshing of their teeth with the internal teeth on said casing and having portions further inward toward the axis of said shaft spaced substantially from the planetary gears whereby liquid from said sealed-in body of liquid can be carried by the planetary gears into said regions of close confinement of the planetary gears there to become trapped between the meshing teeth of the planetary gears and the internal teeth on said casing, said trapped liquid being maintained against escape from between the meshing teeth by the confining walls of the casing, there being clearance cracks between the confining portions of the casing walls and the adjacent meshing teeth of such thinness that the trapped liquid can escape through said clearance cracks only if and when the trapped liquid is subjected to pressure exceeding a predetermined relatively high pressure.

3. A torque-converter comprising a hollow casing, a substantial body of liquid permanently sealed within the hollow of said casing, a shaft extending rotatably through a wall of the casing and having a portion within the hollow of the casing, said casing and shaft being mounted for relative rotation, mechanical means immersed in the liquid in the hollow of said casing and providing an intermeshing mechanical inter-engagement between said casing and said shaft whereby a rotation of said shaft tends to rotate said casing and a rotation of said casing tends to rotate said shaft, the inter-engaging portions of said mechanical means constituting means for trapping liquid between said interengaging portions in response to relative rotation of said casing and said shaft, there being wall portions of said casing closely confining portions of said mechanical means and providing with the latter said portions relatively minute escape passages through which said trapped liquid can escape from between said inter-engaging portions only if and when the pressure on the trapped liquid rises above a predetermined pressure, said trapped liquid serving to lock the trapping inter-engaging portions of said mechanical means to stop relative rotation of said casing and said shaft at times when the pressure on said trapped liquid is below said predetermined pressure.

4. A torque-converter comprising a hollow casing, a substantial body of liquid permanently sealed within the hollow of said casing, a shaft extending rotatably through a wall of the casing and having a portion within the hollow of the casing, a gear fixed on the portion of said shaft which is within the hollow of the casing, gear teeth fixed on the peripheral wall of the hollow of said casing and extending as a circular internal gear concentrically around the axis of said shaft, a plurality of planetary gears within the hollow of the casing, means rotatably supporting said planetary gears for movement in a circular orbit concentric to the axis of said shaft, each of said planetary gears being constantly in mesh with said gear on the shaft and also constantly in mesh with said internal gear on the casing, whereby said casing and shaft are relatively rotatable when said planetary gears are free to travel along the circular internal gear on the casing, said hollow of the casing having wall portions at opposite sides of the planetary gears closely confining the parts of said planetary gears which are in mesh with said internal gear on the casing whereby liquid caught between the adjacent meshing teeth becomes trapped by said confining wall portions so long as the pressure on the trapped liquid does not exceed a predetermined pressure, said confining wall portions providing clearance cracks between them and the confined parts of the planetary gears through which said trapped liquid can escape only if and when the pressure on the trapped liquid exceeds said predetermined pressure.

5. A torque-converting coupling comprising a hollow casing having a body of liquid permanently sealed within its hollow, a shaft extending rotatably into the hollow of the casing, a gear fixed on said shaft within the hollow of the casing, a member within the hollow of said casing and rotatably mounted on said shaft, a plurality of planetary gears, each rotatably mounted on said member, an internal circular gear rigid on said casing interiorly thereof, each said planetary gear being constantly in mesh with said internal gear on the casing and with said gear on the shaft whereby said planetary gears may travel along said internal circular gear to permit relative rotation of said casing and shaft, said hollow of the casing having wall portions at opposite sides of the planetary gears closely confining the parts of said planetary gears which are in mesh with said internal gear on the casing whereby liquid caught between the adjacent meshing teeth becomes trapped by said confining wall portions so long as the pressure on the trapped liquid does not exceed a predetermined pressure, said confining wall portions providing clearance cracks between them and the confined parts of the planetary gears through which said trapped liquid can escape only if and when the pressure on the trapped liquid exceeds said predetermined pressure.

6. A torque-converting coupling comprising a hollow casing having a body of liquid sealed within its hollow, a shaft extending rotatably into the hollow of the casing, a gear fixed on said shaft within the hollow of the casing, a member within the hollow of said casing and rotatably mounted on said shaft, a plurality of planetary gears, each rotatably mounted on said member, an internal circular gear rigid on said casing interiorly thereof, each said planetary gear being constantly in mesh with said internal gear on the casing and with said gear on the shaft whereby said planetary gears may travel along said internal circular gear to permit relative rotation of said casing and shaft, said hollow of the casing having wall portions closely confining the parts of the planetary gears which are in mesh with said internal gear on the casing for trapping liquid between the adjacent meshing teeth only so long as the pressure on the trapped liquid does not exceed a predetermined pressure, a rotatable element set into a cavity in a face of each said planetary gear and rotatable therein on an axis eccentric to the gear axis, each said element being smaller than the cavity in which it is set and each having means at its periphery for meshing with complementary means on the peripheral wall of the cavity during relative rotation of each planetary gear and the rotatable element eccentrically set in its cavity thereby to trap liquid between the meshing portions of said element and the wall of the cavity, said trapped liquid preventing further relative rotation of said elements and planetary gears, which acts additionally to the first mentioned trapping of liquid to lock the planetary gears against travel along the internal gear on the casing thereby assisting in locking the casing and shaft against relative rotation so long as the trapped liquid continues trapped between the meshing portions of said in-set elements and planetary gears.

7. A torque-converting coupling comprising a hollow casing having a body of liquid permanently sealed within its hollow, a shaft extending rotatably into the hollow of the casing, a gear fixed on said shaft within the hollow of the casing, a member within the hollow of said casing and rotatably mounted on said shaft, a plurality of planetary gears, each rotatably mounted on said member, an internal circular gear rigid on said casing interiorly thereof, each said planetary gear being constantly in mesh with said internal gear on the casing and with said gear on the shaft whereby said planetary gears may travel along said internal circular gear to permit relative rotation of said casing and shaft, said member having portions extending in close relation around the toothed peripheries of said gear on the shaft and said planetary gears excepting at the regions of meshing of said gears and at the regions of meshing of the planetary gears with said internal gear on the casing, whereby liquid getting into the tooth grooves of the planetary gears is maintained therein and carried to the regions of meshing of the planetary gears with said internal gear on the casing, said hollow of the casing having wall portions at opposite sides of the planetary gears closely confining the parts of said planetary gears which are in mesh with said internal gear on the casing whereby liquid caught between the adjacent meshing teeth becomes trapped by said confining wall portions so long as the pressure on the trapped liquid does not exceed a predetermined pressure, said confining wall portions providing clearance cracks between them and the confined parts of the planetary gears through which said trapped liquid can escape only if and when the pressure on the trapped liquid exceeds said predetermined pressure.

8. A torque-converter comprising a driving member and a driven member, one of said members being a generally annular housing having interior walls defining a permanently sealed liquid-holding chamber, and the other of said members having a shaft extending rotatably into the chamber of the housing and terminating therein, a circular gear rack fixed on said housing within its said chamber and concentric around the axis of said shaft, a gear fixed on said shaft within the chamber of said housing, a carrier element within the chamber of said housing and rotatable on said shaft, and planetary gears rotatably supported on said carrier element, each in mesh with said gear on said shaft and also in mesh with said circular gear rack, each pair of adjacent teeth of said circular gear rack and each pair of adjacent teeth of each of said planetary gears defining a groove between the teeth of each said pair, said housing having generally parallel interior wall portions closely confining intermeshing portions of said gear rack and planetary gears, with said wall portions in relatively close closing relation to the opposite ends of the grooves between all of the teeth of said gear rack and said planetary gears which at any time are in mesh with each other, whereby liquid in the grooves between said meshing teeth of the gear rack and planetary gears becomes trapped within said grooves so long as the pressure thereon is below a predetermined pressure, there being clearance cracks between said wall portions and said gears of such thinness that liquid trapped in said grooves can escape therethrough only if and when said liquid is subjected to pressure exceeding said predetermined pressure, said housing having other interior wall portions, inward toward the axis of said shaft, which are substantially spaced from opposite sides of said planetary gears whereby liquid from said sealed chamber of the housing is free to enter the grooves between teeth of the planetary gears as said teeth advance toward their regions of meshing with said gear rack.

References Cited in the file of this patent

UNITED STATES PATENTS

| 1,165,381 | Anderson | Dec. 28, 1915 |
| 1,296,769 | Cooke | Mar. 11, 1919 |
| 1,752,385 | Johnson | Apr. 1, 1930 |
| 2,300,626 | McLaren | Nov. 3, 1942 |
| 2,301,292 | Krick | Nov. 10, 1942 |
| 2,371,227 | Dodge | Mar. 13, 1945 |
| 2,399,008 | Doran | Apr. 23, 1946 |
| 2,436,669 | Rausenberger | Feb. 24, 1948 |

FOREIGN PATENTS

| 576,635 | France | 1924 |
| 824,606 | France | Feb. 11, 1948 |